US012701586B2

(12) United States Patent (10) Patent No.: US 12,701,586 B2
Zeng (45) Date of Patent: Aug. 4, 2026

(54) SCHEDULING METHOD AND APPARATUS FOR SHARED CHANNEL, TERMINAL, AND NETWORK SIDE DEVICE

(71) Applicant: VIVO MOBILE COMMUNICATION CO., LTD., Guangdong (CN)

(72) Inventor: Chaojun Zeng, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 316 days.

(21) Appl. No.: 18/507,508

(22) Filed: Nov. 13, 2023

(65) Prior Publication Data

US 2024/0080861 A1 Mar. 7, 2024

Related U.S. Application Data

(63) Continuation of application No. PCT/CN2022/092007, filed on May 10, 2022.

(30) Foreign Application Priority Data

May 11, 2021 (CN) .......................... 202110513636.6

(51) Int. Cl.
*H04W 72/232* (2023.01)
*H04L 1/00* (2006.01)

(52) U.S. Cl.
CPC ......... *H04W 72/232* (2023.01); *H04L 1/0004* (2013.01)

(58) Field of Classification Search
CPC ............ H04W 72/232; H04W 72/0446; H04L 1/0004; H04L 1/0031; H04L 1/0003;
(Continued)

(56) References Cited

U.S. PATENT DOCUMENTS

2014/0119266 A1* 5/2014 Ng ....................... H04L 27/2602
370/312
2015/0327226 A1* 11/2015 Cheng ................... H04L 5/0044
370/329
(Continued)

FOREIGN PATENT DOCUMENTS

CN 101801097 A 8/2010
CN 111277388 A 6/2020
(Continued)

OTHER PUBLICATIONS

International Search Report and Written Opinion for Application No. PCT /CN2022/092007, dated Jul. 27, 2022, 8 Pages.
(Continued)

*Primary Examiner* — Kiet Tang
(74) *Attorney, Agent, or Firm* — Foley & Lardner LLP

(57) ABSTRACT

A scheduling method and apparatus for a shared channel, a terminal, and a network side device, and relates to the field of communication technologies. The scheduling method for a shared channel in embodiments of this application includes: receiving, by a terminal, first downlink control information DCI, where the first DCI is for scheduling transmission of at least one shared channel, and the first DCI includes scheduling information for the at least one shared channel, where the scheduling information includes at least one of the following: time domain resource assignment information corresponding to the at least one shared channel, codeword indication information, virtual resource block VRB-to-physical resource block PRB mapping information, PRB bundling size indication information, rate matching indication information, zero power channel state information reference signal ZP CSI-RS trigger information, and a non-numerical feedback time offset.

16 Claims, 3 Drawing Sheets

(58) Field of Classification Search
CPC ... H04L 1/1819; H04L 1/1896; H04L 5/0016; H04L 5/0044; H04L 5/0053; H04L 5/0058; H04L 5/0078; H04L 5/0094; H04L 5/0057; H04L 5/0064; H04L 1/1816; H04B 7/0456
See application file for complete search history.

(56) References Cited

U.S. PATENT DOCUMENTS

| | | | |
|---|---|---|---|
| 2019/0181976 A1* | 6/2019 | Golitschek Edler von Elbwart ... | H04L 1/0004 |
| 2019/0253220 A1* | 8/2019 | Kim | H04B 7/0695 |
| 2020/0045737 A1* | 2/2020 | Ly | H04L 1/1816 |
| 2020/0259625 A1* | 8/2020 | Papasakellariou ... | H04B 7/0456 |
| 2020/0351955 A1* | 11/2020 | Jeon | H04L 1/1642 |
| 2022/0069957 A1 | 3/2022 | Lee et al. | |
| 2022/0095337 A1 | 3/2022 | Wang et al. | |
| 2022/0217581 A1 | 7/2022 | Mu | |
| 2022/0217729 A1 | 7/2022 | Kim et al. | |
| 2022/0256586 A1 | 8/2022 | Zeng et al. | |
| 2022/0329386 A1 | 10/2022 | Ye et al. | |

FOREIGN PATENT DOCUMENTS

| | | |
|---|---|---|
| CN | 111726204 A | 9/2020 |
| CN | 111836378 A | 10/2020 |
| EP | 3576336 A1 | 12/2019 |
| WO | 2011082573 A1 | 7/2011 |
| WO | 2020130755 A1 | 6/2020 |
| WO | 2020222605 A1 | 11/2020 |
| WO | 2020223960 A1 | 11/2020 |
| WO | 2021043010 A1 | 3/2021 |
| WO | 2021055840 A2 | 3/2021 |

OTHER PUBLICATIONS

First Office Action for Chinese Application No. 202110513636.6, dated Aug. 23, 2024, 11 Pages.
Extended European Search Report for Application No. 22806752.6, dated Oct. 11, 2024, 8 Pages.

\* cited by examiner

Start

A terminal receives first downlink control information DCI 201

End

Scheduling apparatus for a shared channel 300

Receiving module 301

Start

A network side device sends first downlink control information DCI    501

End

Scheduling apparatus for a shared channel    600

Sending module    601

SCHEDULING METHOD AND APPARATUS FOR SHARED CHANNEL, TERMINAL, AND NETWORK SIDE DEVICE

CROSS-REFERENCE TO RELATED APPLICATIONS

This application is a continuation of International Application No. PCT/CN2022/092007 filed on May 10, 2022, which claims priority to Chinese Patent Application No. 202110513636.6 filed on May 11, 2021, which are incorporated herein by reference in their entireties.

TECHNICAL FIELD

This application relates to the field of communication, and in particular, to a scheduling method and apparatus for a shared channel, a terminal, and a network side device.

BACKGROUND

In the study process of the feature with spectrum from 52.6 to 71 GHz in Release 17 (Release 17, Rel-17), it was confirmed that new subcarrier spacings (Subcarrier Spacings, SCSs) need to be introduced for new deployment frequency band(s) of New Radio (New Radio, NR), including 480 kHz and 960 kHz. For these newly introduced SCSs, physical downlink control channel (Physical Downlink Control Channel, PDCCH) monitoring needs to be adjusted or enhanced accordingly, such as avoiding the need for a user equipment (User Equipment, UE, also referred to as a terminal) to monitor PDCCH(s) within each slot (that is a short duration) to reduce the complexity of UE implementation. Correspondingly, in order to fully utilize the time domain resource within a carrier, it is necessary to study/introduce multi-physical downlink shared channel (Multi-Physical Downlink Shared Channel, Multi-PDSCH) scheduling and multi-physical uplink shared channel (Multi-Physical Uplink Shared Channel, Multi-PUSCH) scheduling.

The Multi-PDSCH scheduling refers to a single piece of downlink control information (Downlink Control Information, DCI) is capable of scheduling multiple PDSCH receptions on a same carrier. According to the NR specification, these PDSCH receptions do not overlap with each other in time domain.

For the Multi-PDSCH scheduling, there are still some scheduling details that have not been discussed and corresponding solutions have not been formed, which affects the practical application of the Multi-PDSCH scheduling.

SUMMARY

Embodiments of this application provide a scheduling method and apparatus for a shared channel, a terminal, and a network side device, which can solve the problem that there is no complete solution for configuration and indication of Multi-PDSCH scheduling in related technologies, and it would affect the practical application of the Multi-PDSCH scheduling.

According to a first aspect, a scheduling method for a shared channel is provided, including:

receiving, by a terminal, first downlink control information DCI, where the first DCI is for scheduling transmission of at least one shared channel, and the first DCI includes scheduling information for the at least one shared channel, where the scheduling information includes at least one of the following:

time domain resource assignment information corresponding to the at least one shared channel, codeword indication information, virtual resource block (Virtual Resource Block, VRB)-to-physical resource block (Physical Resource Block, PRB) mapping information, PRB bundling size indication information, rate matching indication information, zero power channel state information reference signal (Zero Power Channel State Information Reference Signal, ZP CSI-RS) trigger information, and a non-numerical feedback time offset.

According to a second aspect, a scheduling method for a shared channel is provided, including:

sending, by a network side device, first downlink control information DCI, where the first DCI is for scheduling transmission of at least one shared channel, and the first DCI includes scheduling information for the at least one shared channel, where the scheduling information includes at least one of the following:

time domain resource assignment information corresponding to the at least one shared channel, an index of the shared channel in a time domain resource assignment table for the first DCI scheduling, codeword indication information, virtual resource block VRB-to-physical resource block PRB mapping information, PRB bundling size indication information, rate matching indication information, zero power channel state information reference signal ZP CSI-RS trigger information, and a non-numerical feedback time offset.

According to a third aspect, a scheduling apparatus for a shared channel is provided, including:

a receiving module, configured to receive first downlink control information DCI, where the first DCI is for scheduling transmission of at least one shared channel, and the first DCI includes scheduling information for the at least one shared channel, where the scheduling information includes at least one of the following:

time domain resource assignment information corresponding to the at least one shared channel, codeword indication information, virtual resource block VRB-to-physical resource block PRB mapping information, PRB bundling size indication information, rate matching indication information, zero power channel state information reference signal ZP CSI-RS trigger information, and a non-numerical feedback time offset.

According to a fourth aspect, a terminal is provided. The terminal includes a processor, a memory, and a program or instructions stored in the memory and executable on the processor, the program or the instructions, when executed by the processor, implementing steps of the method according to the first aspect.

According to a fifth aspect, a terminal is provided, including a processor and a communication interface. The communication interface is configured to receive first downlink control information DCI, where the first DCI is for scheduling transmission of at least one shared channel, and the first DCI includes scheduling information for the at least one shared channel, where the scheduling information includes at least one of the following:

time domain resource assignment information corresponding to the at least one shared channel, codeword indication information, virtual resource block VRB-tophysical resource block PRB mapping information, PRB bundling size indication information, rate matching indication information, zero power channel state information reference signal ZP CSI-RS trigger information, and a non-numerical feedback time offset.

According to a sixth aspect, a scheduling apparatus for a shared channel is provided, including:

a sending module, configured to send first downlink control information DCI, where the first DCI is for scheduling transmission of at least one shared channel, and the first DCI includes scheduling information for the at least one shared channel, where the scheduling information includes at least one of the following:

time domain resource assignment information corresponding to the at least one shared channel, an index of the shared channel in a time domain resource assignment table for the first DCI scheduling, codeword indication information, virtual resource block VRB-to-physical resource block PRB mapping information, PRB bundling size indication information, rate matching indication information, zero power channel state information reference signal ZP CSI-RS trigger information, and a non-numerical feedback time offset.

According to a seventh aspect, a network side device is provided. The network side device includes a processor, a memory, and a program or instructions stored in the memory and executable on the processor, the program or the instructions, when executed by the processor, implementing steps of the method according to the second aspect.

According to an eighth aspect, a network side device is provided, including a processor and a communication interface. The communication interface is configured to send first downlink control information DCI, where the first DCI is for scheduling transmission of at least one shared channel, and the first DCI includes scheduling information for the at least one shared channel, where the scheduling information includes at least one of the following:

time domain resource assignment information corresponding to the at least one shared channel, an index of the shared channel in a time domain resource assignment table for the first DCI scheduling, codeword indication information, virtual resource block VRB-to-physical resource block PRB mapping information, PRB bundling size indication information, rate matching indication information, zero power channel state information reference signal ZP CSI-RS trigger information, and a non-numerical feedback time offset.

According to a ninth aspect, a readable storage medium is provided, storing a program or instructions, the program or instructions, when executed by a processor, implementing steps of the method according to the first aspect, or implementing steps of the method according to the second aspect.

According to a tenth aspect, a chip is provided. The chip includes a processor and a communication interface, where the communication interface is coupled to the processor, and the processor is configured to run a program or instructions, to implement steps of the method according to the first aspect or the second aspect.

According to an eleventh aspect, a computer program/program product is provided, where the computer program/program product is stored in a storage medium and executed by at least one processor to implement steps of the method according to the first aspect or the second aspect.

In embodiments of this application, the first DCI, scheduling the transmission of at least one shared channel, includes scheduling information for the at least one shared channel, which is used to indicate and specify at least one of the codeword indication information, the VRB-to-PRB mapping information, the PRB bundling size indication information, the rate matching indication information, the ZP CSI-RS trigger information, and the non-numerical feedback time offset for shared channel(s) scheduled by the first DCI, thereby ensuring that the practical application of scheduling of multiple shared channels is not affected.

DETAILED DESCRIPTION

The following clearly describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application fall within the protection scope of this application.

The specification and claims of this application, and terms "first" and "second" are used to distinguish similar objects, but are unnecessarily used to describe a specific sequence or order. It should be understood that the terms in such a way are interchangeable in proper circumstances, so that the embodiments of this application can be implemented in other orders than the order illustrated or described herein. Objects distinguished by "first", "second", and the like are usually one type, and the number of objects is not specified. For example, the first object may be one or more than one. In addition, in the specification and the claims, "and/or" means at least one of the connected objects, and the character "/" generally indicates an "or" relationship between the associated objects.

It should be noted that, the technologies described in the embodiments of this application are not limited to a Long Term Evolution (Long Term Evolution, LTE) system or an LTE-Advanced (LTE-Advanced, LTE-A) system, and can also used in other wireless communication systems, such as, Code Division Multiple Access (Code Division Multiple Access, CDMA), Time Division Multiple Access (Time Division Multiple Access, TDMA), Frequency Division Multiple Access (Frequency Division Multiple Access, FDMA), Orthogonal Frequency Division Multiple Access (Orthogonal Frequency Division Multiple Access, OFDMA), and Single-carrier Frequency-Division Multiple Access (Single-carrier Frequency-Division Multiple Access, SC-FDMA). The terms "system" and "network" in the embodiments of this application are often used interchangeably, and the described technology can be used not only for the above systems and radio technologies, but also for other systems and radio technologies. The following description describes a new radio (New Radio, NR) system for example objectives, and NR terms are used in most of the description below. These technologies are also applicable to applications other than NR system applications, such as a 6th generation (6th Generation, 6G) communication system.

Figures 1, 2, 3:
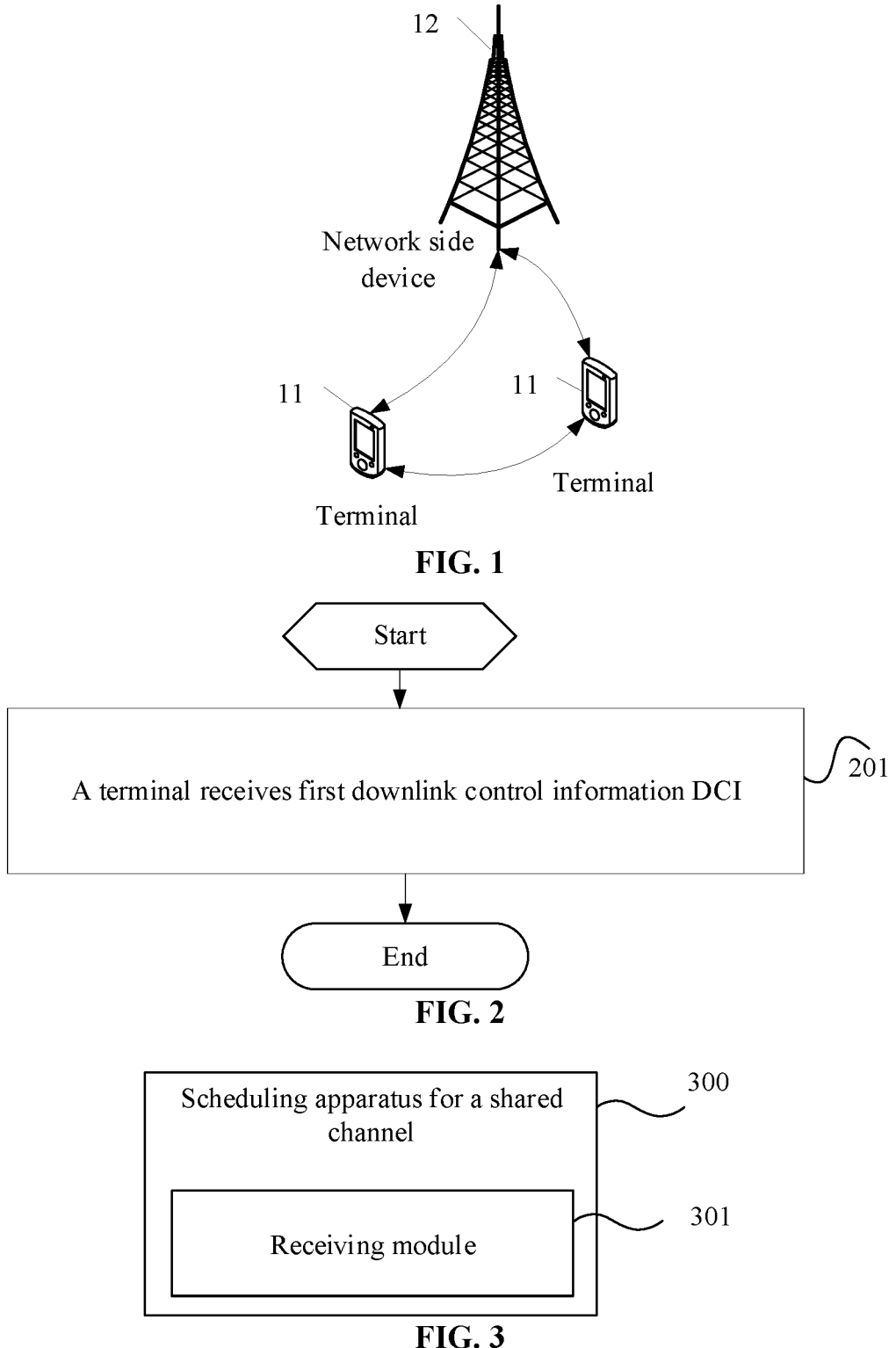
FIG. 1 is a block diagram of a wireless communication system to which an embodiment of this application can be applied.
FIG. 2 is a first schematic flowchart of a scheduling method for a shared channel according to an embodiment of this application.
FIG. 3 is a first schematic diagram of a module of a scheduling apparatus for a shared channel according to an embodiment of this application.

FIG. 1 is a block diagram of a wireless communication system to which an embodiment of this application can be applied. The wireless communication system includes a terminal 11 and a network side device 12. The terminal 11 may also be referred to as a terminal device or a user equipment (User Equipment, UE). The terminal 11 may be, for example, a terminal-side device such as a mobile phone, a tablet personal computer (Tablet Personal Computer), a laptop computer (Laptop Computer), a personal digital assistant (Personal Digital Assistant, PDA), a palmtop computer, a netbook, an ultra-mobile personal computer (ultra-mobile personal computer, UMPC), a mobile Internet device (Mobile Internet Device, MID), a wearable device (Wearable Device), an in-vehicle device (VUE), or a pedestrian terminal (PUE). The wearable device includes: a smart-watch, a bracelet, earphones, glasses, or the like. It should be noted that a specific type of the terminal 11 is not specified in the embodiments of this application. The network side device 12 may be a base station or a core network, where the base station may be referred to as a node B, an evolution node B, an access point, a base transceiver station (Base Transceiver Station, BTS), a radio base station, a radio transceiver, a basic service set (Basic Service Set, BSS), an extended service set (Extended Service Set, ESS), a B node, an evolutionary B node (eNB), a household B node, a household evolutionary B node, a WLAN access point, a WiFi node, a transmitting receiving point (transmitting Receiving Point, TRP), or some other suitable term in the field, provided that the same technical effect is achieved, the base station is not limited to a particular technical term, and it should be noted that: in the embodiments of this application, only a base station in an NR system is taken as an example, but the specific type of the base station is not specified.

A scheduling method and apparatus for a shared channel, a terminal, and a network side device provided in the embodiments of this application are described below through some embodiments and application scenarios thereof with reference to the accompanying drawings.

As shown in FIG. 2, this embodiment provides a scheduling method for a shared channel, including:

Step 201: The terminal receives first downlink control information DCI.

The first DCI is for scheduling transmission of at least one shared channel, and the first DCI includes scheduling information for the at least one shared channel.

Optionally, the scheduling information includes but is not limited to at least one of the following:

time domain resource assignment information corresponding to the at least one shared channel, codeword indication information, virtual resource block (Virtual Resource Block, VRB)-to-physical resource block (Physical Resource Block, PRB) mapping information, PRB bundling size indication information, rate matching indication information, zero power channel state information reference signal (Zero Power Channel State Information Reference Signal, ZP CSI-RS) trigger information, and a non-numerical feedback time offset.

It should be noted that the first DCI mentioned in the embodiments of this application can schedule both a physical uplink shared channel (Physical Uplink Shared Channel, PUSCH) and a physical downlink shared channel (Physical Downlink Shared Channel, PDSCH), that is, the shared channel mentioned above includes the PDSCH and/or the PUSCH.

It should be noted that, the first DCI refers to DCI sent by the network side device to the terminal for scheduling a shared channel.

Optionally, before the terminal receives the first DCI sent by the network side device, the network side device needs to first configure a time domain resource assignment table (Time Domain Resource Assignment Table, TDRA Table) and send configuration information of the time domain resource assignment table to the terminal. Optionally, the configuration information of the time domain resource assignment table can be used by the network side device to configure a target row in the time domain resource assignment table (it should be noted that, the target row is any row in the time domain resource assignment table). A configuration rule for the target row includes any one of the following:

A11. Each time domain resource assignment record in the target row corresponds to a transmission time offset.

The time domain resource assignment record can be understood as indicating the resources assigned by a single scheduled shared channel in the time domain, such as an occupied symbol set.

The transmission time offset can be understood as a time offset between each shared channel and the first DCI when the first DCI indicates the target row to schedule a corresponding shared channel of each time domain resource assignment record in this target row at once. For example, an offset between a time unit at which each shared channel is located and a time unit at which transmission of the first DCI is located, and granularity is the time unit, such as a slot.

It can be understood that in this configuration method, a slot level or symbol level gap (Gap) is allowed between symbol sets corresponding to adjacent time domain resource assignment records.

A12. Each time domain resource assignment record subset in the target row corresponds to a transmission time offset.

It should be noted that in this configuration method, when each row in the time domain resource assignment table is configured, one or more transmission time offsets can be configured, and each transmission time offset corresponds to one or more time domain resource assignment records and associated information, such as a mapping type (Mapping type). The symbol set corresponding to one or more time domain resource assignment records corresponding to each transmission time offset requires continuity or discontinuity (there may be a symbol level gap in this case).

It should be noted that, because the time domain resource assignment table usually includes a plurality of rows, when the network side devices performs configuration, all rows in the time domain resource assignment table are configured in a same or different methods. For example, the time domain resource assignment table includes 10 rows, 10 rows are all configured using A11 or A12, or some of these 10 rows are configured using A11 or A12.

Optionally, the time domain resource assignment record may be a start and length indication value (Start and Length Indication Value, SLIV) record.

It should also be noted that, for the Multi-PDSCH scheduling, the foregoing transmission time offset can be represented by K0, and for the PUSCH scheduling, the foregoing transmission time offset can be represented by K2.

The following are detailed explanations of different parameters included in the scheduling information.

1. Scheduling Information Includes Codeword Indication Information

It should be noted that in a case that dual codeword transmission is allowed, an indication of the codeword indication information satisfies any one of the following:

B11. Use an independent indication domain to indicate an enabled state of each codeword.

It should be noted that in this case, a new field is introduced in the first DCI to directly indicate the enabled state of each codeword, for example, a new indication bit can be introduced, or a bit from an existing indication domain can be reused.

Optionally, in this case, an indication of the codeword indication information satisfies one of the following:

B111. The independent indication domain is used to indicate an enabled state of each codeword of the at least one shared channel scheduled by the first DCI.

It should be noted that in order to reduce indication overhead, unified indication can be applied to the shared channels of each scheduling, that is, a single indication in the first DCI can be applied to each shared channel of the first DCI scheduling. For example, unified indication can be applied to the PDSCH of each scheduling, that is, a single indication in the first DCI can be applied to each PDSCH of the first DCI scheduling. That is, the independent indication domain is used to indicate the enabled state of each codeword of all shared channels scheduled by the first DCI.

For example, in this case, different bits can be used to indicate the enabled state of each transport block (Transport Block, TB) (such as TB1 and TB2) respectively, and applied to each PDSCH scheduled by the first DCI.

B112. The independent indication domain respectively indicates an enabled state of each codeword of each shared channel scheduled by the first DCI.

It should be noted that in order to improve flexibility of indication, it is also possible to indicate separately for each shared channel. For example, if the first DCI schedules two PDSCHs, the first DCI includes two independent indication domains, and each indication domain is used to indicate the enabled state of each codeword of a PDSCH.

B12. Use a first value combination of a first indication domain to indicate an enabled state of each codeword.

It should be noted that in this case, the specific value combination of the existing indication domain is used for indication, that is, the first indication domain is the indication domain already used in the existing first DCI, for example, using the value combination in the existing indication domain that does not represent other indication meanings to indicate the enabled state of each codeword. In this way, the enabled state of the codeword can be determined separately for each scheduled shared channel.

Optionally, in this case, the enabled state of each codeword is determined by using one of the following rules:

B121. When each TB of each shared channel scheduled by the first DCI corresponds to two redundant version (Redundant Version, RV) indication bits, if a first modulation and coding scheme (Modulation and Coding Scheme, MCS) index corresponding to a first target TB is a preset MCS index and a first RV index corresponding to the first target TB is a preset RV index, the first target TB is determined to be in a disabled state.

It should be noted that the first target TB referred to in this embodiment of this application refers to any TB corresponding to any shared channel scheduled by the first DCI; and the RV index refers to an RV number, such as an RV ID (identifier).

That is to say, when each TB of each scheduled shared channel corresponds to two RV indication bits, the existing mechanism can be used, that is, when the first MCS index corresponding to the first target TB is 26 and the first RV index corresponding to the first target TB is 1, the first target TB is disabled, that is, the first target TB is in a disabled state.

It should be noted that, based on current technologies, for example, only when the DCI schedules a single PDSCH, (the first TB of) this PDSCH corresponds to two RV indication bits, otherwise (the first TB of) each scheduled PDSCH only corresponds to a single RV indication bit.

B122. When each TB of each shared channel scheduled by the first DCI corresponds to an RV indication bit, if a second MCS index corresponding to a second target TB is a preset MCS index and a second RV index corresponding to the second target TB is one of two RV index values corresponding to the RV indication bit, the second target TB is determined to be in a disabled state.

It should be noted that the second target TB referred to in this embodiment of this application refers to any TB corresponding to any shared channel scheduled by the first DCI; and the RV index refers to an RV number.

That is to say, when each TB of each scheduled shared channel corresponds to an RV indication bit, the first MCS index corresponding to the first target TB is 26, and the first RV index corresponding to the first target TB is one value of the two RV indexes corresponding to the RV indication bit (for example, the first RV index corresponding to the first target TB is 2), the first target TB is disabled, that is, the first target TB is in a disabled state.

It should be noted that for the Multi-PUSCH scheduling of 5G new radio in unlicensed spectrum (5G New Radio in Unlicensed Spectrum, NR-U) in Release 16 (Rel-16), when each PUSCH corresponds to a single RV indication bit, the RV index (RVid) can only be taken as 0 or 2, as shown in Table 1. If the Multi-PDSCH scheduling further follows this mechanism, the value of RVid needs to be adjusted.

TABLE 1

| Correspondence between RV Index and Value | |
|---|---|
| Value of the Redundancy version field | Value of $rv_{id}$ to be applied |
| 0 | 0 |
| 1 | 2 |

B123. When each TB of each shared channel scheduled by the first DCI corresponds to an RV indication bit, if a third MCS index corresponding to a third target TB is a preset MCS index, a third RV index corresponding to the third target TB is one of two RV index values corresponding to the RV indication bit, and a value of a second indication domain corresponding to the third target TB satisfies a preset condition, the third target TB is determined to be in a disabled state.

It should be noted that the third target TB referred to in this embodiment of this application refers to any TB corresponding to any shared channel scheduled by the first DCI; and the RV index refers to an RV number.

Optionally, the second indication domain includes a new data indicator (New Data Indicator, NDI) indication domain corresponding to the third target TB, and the preset condition includes one of the following:

B1231. The NDI indication domain is a preset value; and

B1232. A value of the NDI indication domain is reversed or not reversed relative to an NDI value before a first hybrid automatic repeat request (Hybrid Automatic Repeat Request, HARQ) process.

It should be noted that the first HARQ process is an HARQ process occupied by the shared channel corresponding to the third target TB.

It should also be noted that, for example, when the shared channel is a PDSCH, and the terminal indicates or determines the enabled state of the codeword for each scheduled PDSCH, it is assumed that the antenna port (Antenna port (s)) indicated in the DCI is applied to each PDSCH scheduled by the DCI, the terminal can determine its transmission attributes for each PDSCH based on the enabled state of two codewords (that is enable/disabled), including the set of occupied demodulation reference signal ports (Demodulation Reference Signal ports, DMRS ports).

Optionally, whether the dual codeword transmission is allowed can be notified by the network side device in advance to the terminal, for example, based on high-level signaling configuration to the terminal.

Optionally, when dual codeword transmission is allowed, further limitations can be placed on a maximum quantity of shared channels simultaneously scheduled by a single DCI. For example, if only single codeword transmission is supported, the maximum quantity of shared channels that a single DCI can schedule is M (which can be later referred to as a maximum value of a single codeword), then when dual codeword transmission is allowed, the maximum quantity of shared channels that a single DCI can schedule is M/2, or M/2 can be further rounded up or down as the maximum quantity of shared channels that a single DCI can schedule, which can be later referred to as the maximum value of dual codewords. Optionally, this can be achieved by limiting the configuration of the time domain resource assignment table. For example, when the high-level signaling configuration allows dual codeword transmission, a quantity of pieces of time domain resource assignment information configured in any row of the time domain resource assignment table corresponding to the DCI that can be used to schedule multiple shared channel transmissions cannot exceed the maximum value of the dual codeword mentioned above. A piece of time domain resource assignment information in a certain row can correspond one to one with a shared channel (it can be understood that when the high-level signaling configuration only allows single codeword transmission, these limitations can still be used, except that the maximum value of dual codewords is replaced by the maximum value of a single codeword).

2. Scheduling Information Includes VRB-to-PRB Mapping Information

It should be noted that when the terminal supports a resource allocation type 1 (resource allocation type 1) and supports an interleaved VRB-to-PRB mapping (interleaved VRB-to-PRB mapping), an indication of the VRB-to-PRB mapping information includes one of the following:

C11. The first DCI includes a plurality of indication domains, and each indication domain respectively indicates VRB-to-PRB mapping information corresponding to a scheduled shared channel.

Optionally, in this case, there is a corresponding indication domain for each schedulable shared channel, for example, the indication domain includes 1 bit.

C12. The first DCI includes an indication domain, and the indication domain is used to indicate VRB-to-PRB mapping information corresponding to a target shared channel in a scheduled shared channel set.

That is to say, in this case, a single indication domain is used to indicate the VRB-to-PRB mapping information of a single shared channel in the set of shared channels scheduled by the first DCI.

Optionally, the target shared channel is a first shared channel, a last shared channel, or a shared channel with a preset index scheduled by the first DCI.

Further, in this case, the other shared channels scheduled by the first DCI adopt a predefined mapping method, and the predefined mapping method can be specified by the protocol or configured based on high-level signaling.

C13. The first DCI includes an indication domain, and VRB-to-PRB mapping information indicated by the indication domain is applied to each scheduled shared channel.

It should be noted that this case refers to a single indication domain is applied to indicate the VRB-to-PRB mapping information for each scheduled shared channel.

Optionally, whether the terminal supports the resource allocation type 1 or supports the interleaved VRB-to-PRB mapping can be notified by the network side device in advance to the terminal, for example, based on high-level signaling configuration to the terminal.

3. Scheduling Information Includes PRB Bundling Size Indication Information

It should be noted that in a case that dynamic PRB bundling is used (for example, when a high-level parameter PRB bundling type configured by the network side device is set to dynamic bundling), an indication of the PRB bundling size indication information includes one of the following:

D11. The first DCI includes a plurality of indication domains, and each indication domain respectively indicates a PRB bundling size corresponding to a scheduled shared channel.

Optionally, in this case, there is a corresponding indication domain for each schedulable shared channel, for example, the indication domain includes 1 bit.

D12. The first DCI includes an indication domain, and the indication domain is used to indicate a PRB bundling size corresponding to a target shared channel in a scheduled shared channel set.

That is to say, in this case, a single indication domain is used to indicate PRB bundling size indication information of a single shared channel in the set of shared channels scheduled by the first DCI.

Optionally, the target shared channel is a first shared channel, a last shared channel, or a shared channel with a preset index scheduled by the first DCI.

Further, in this case, the other shared channels scheduled by the first DCI adopt a predefined precoding granularity (Precoding granularity), and the predefined precoding granularity can be specified by the protocol or configured based on high-level signaling.

D13. The first DCI includes an indication domain, and a PRB bundling size indicated by the indication domain is applied to each scheduled shared channel.

It should be noted that this case refers to a single indication domain is applied to indicate a PRB bundling size of each scheduled shared channel.

4. Scheduling Information Includes Rate Matching Indication Information

It should be noted that when it is necessary to dynamically indicate whether a resource set corresponding to a rate match pattern group 1 (rateMatchPatternGroup1) and/or a rate match pattern group 2 (rateMatchPatternGroup2) can be used for shared channel transmission (For example, when configuration condition of the high-level parameters rateMatchPatternGroup1 and rateMatchPatternGroup2 that are configured based on the network side device needs to indicate whether the resource set corresponding to each configuration rate match pattern group in DCI format 1_1 can be used for PDSCH transmission), an indication of the rate matching indication information includes one of the following:

E11. The first DCI includes a plurality of indication domains, and each indication domain respectively indicates rate matching indication information corresponding to a scheduled shared channel.

Optionally, in this case, there is a corresponding indication domain for each schedulable shared channel, for example, the indication domain includes 1 bit or 2 bits, and each bit indicates whether the resource set corresponding to the rate match pattern group can be used for the scheduled shared channel transmission. When it is 1 bit, this bit corresponds to the rate match pattern group 1; and when it is 2 bits, each bit corresponds to the rate match pattern group 1 and the rate match pattern group 2 in sequence.

E12. The first DCI includes an indication domain, and the indication domain is used to indicate rate matching indication information corresponding to a target shared channel in a scheduled shared channel set.

That is to say, in this case, a single indication domain is used to indicate rate match indication information of a single shared channel in the set of shared channels scheduled by the first DCI.

Optionally, the target shared channel is a first shared channel, a last shared channel, or a shared channel with a preset index scheduled by the first DCI.

Further, in this case, other shared channels scheduled by the first DCI adopt predefined resource availability assumptions, which can be specified by the protocol or configured based on high-level signaling. For example, the relevant regulations for shared channels (such as PDSCH) scheduled for DCI format 1_0 can be used continuously, and the resource set indicated by all groups (that is rate match pattern group, based on the configuration condition of high-level parameters rateMatchPatternGroup1 and rateMatch-PatternGroup2, can be 0/1/2) are not usable during shared channel transmission.

E13. The first DCI includes an indication domain, and rate matching indication information indicated by the indication domain is applied to each scheduled shared channel.

It should be noted that this case refers to a single indication domain is applied to indicate the rate match indication information of each scheduled shared channel.

5. Scheduling Information Includes ZP CSI-RS Trigger Information

It should be noted that when it is necessary to dynamically indicate an aperiodic ZP CSI-RS resource set (for example, when a quantity of aperiodic ZP CSI-RS resource sets configured by the network side device based on high-level signaling is greater than 0), an indication of the ZP CSI-RS trigger information includes one of the following:

the first DCI includes an indication domain, and ZP CSI-RS trigger information indicated by the indication domain is applied to one of the following:

F11. A target shared channel in a scheduled shared channel set.

That is to say, in this case, a single indication domain indicates the ZP CSI-RS trigger information of a single shared channel in the set of shared channels scheduled by the first DCI.

Optionally, the target shared channel is a first shared channel, a last shared channel, or a shared channel with a preset index scheduled by the first DCI.

Further, in this case, the other shared channels scheduled by the first DCI adopt a predefined trigger assumption, and the predefined trigger assumption can be specified by the protocol or configured based on high-level signaling, for example, it is assumed that no aperiodic ZP CSI-RS resource set is triggered.

F12. A target time unit in time units occupied by a scheduled shared channel set.

That is to say, in this case, a single indication domain indicates the ZP CSI-RS trigger information of a single time unit in time units occupied by the shared channel set scheduled by the first DCI.

Optionally, the target time unit is a first time unit, a last time unit, or a time unit with a preset index occupied by the shared channel set scheduled by the first DCI. In this case, all shared channels transmitted within this time unit consider the impact of a trigger condition of the aperiodic ZP CSI-RS resource set in a single indication domain.

Further, in this case, the other time units in the time units occupied by the shared channel set scheduled by the first DCI adopt a predefined trigger assumption, and the pre-defined trigger assumption can be specified by the protocol or configured based on high-level signaling, for example, it is assumed that no aperiodic ZP CSI-RS resource set is triggered. In this case, all shared channels transmitted within these time units are not affected by the aperiodic ZP CSI-RS.

F13. Each scheduled shared channel.

That is to say, in this case, a single indication domain indicates the ZP CSI-RS trigger information of all shared channels scheduled by the first DCI.

F14. Each time unit in time units occupied by a scheduled shared channel set.

That is to say, in this case, a single indication domain indicates the ZP CSI-RS trigger information of each time unit occupied by the shared channel set scheduled by the first DCI.

It should be noted that methods of F13 and F14 can be understood to use the solution for multi-slot PDSCH scheduling (Multi-slot PDSCH scheduling) in Rel-15/16 continuously.

It should be noted that the foregoing time unit may be a slot (Slot) or a sub-slot (Sub-slot), or other predefined unit durations, such as millisecond (ms), or a predefined quantity of slots or sub-slots, without any specification here.

6. Scheduling Information Includes a
Non-Numerical Feedback Time Offset (Can be
Represented by NNK1)

It should be noted that when a single DCI schedules one or more shared channel transmissions, it can indicate a non-numerical feedback time offset. Further, the non-numerical feedback time offset can be indicated for a shared channel subset in a shared channel set including one or more shared channels scheduled by a single DCI. In this case, it can be understood that for the single shared channel, or for each shared channel in the shared channel set/subset, the corresponding rules/mechanisms corresponding to the non-numerical feedback time offset are applied.

It should be noted that in this case, for a target HARQ process that does not provide an available HARQ acknowledgment (HARQ Acknowledgement, HARQ-ACK) feedback time, the terminal uses a restriction mode as follows:

G11. Before the network side device provides the available HARQ-ACK feedback time for the target HARQ process, the terminal does not expect the target HARQ process to be scheduled or configured for new shared channel transmission.

The restriction mode can be understood as: before the network side device provides the available HARQ-ACK feedback time for the target HARQ process, new shared channel transmission is not scheduled or configured for the target HARQ process. That is to say, before the network side device provides the available HARQ-ACK feedback time for the target HARQ process, if new shared channel transmission is scheduled or configured for the target HARQ process, it is an error case (error case).

That is to say, in this case, if the network side device does not provide a specific HARQ-ACK feedback time for this HARQ process/the shared channel transmission corresponding to this HARQ process, the terminal does not expect the target HARQ process to be scheduled or configured for the new shared channel transmission, that is, the target HARQ process cannot be scheduled for new shared channel transmission, or there cannot be a configured shared channel transmission (such as semi-persistent scheduling (Semi-Persistent Scheduling, SPS) PDSCH transmission) occupying the target HARQ process, or it can be understood that the target HARQ process is in a suspended state that cannot be further occupied. Optionally, the network must provide specific HARQ-ACK feedback time for the HARQ process/PDSCH transmission to ensure the normal occupancy of the HARQ process.

The usable HARQ-ACK feedback time, available HARQ-ACK feedback time, or specific HARQ-ACK feedback time can all be understood as legal HARQ-ACK feedback time. Based on this HARQ-ACK feedback time, the time unit at which the HARQ-ACK feedback is located can be determined, and the corresponding HARQ-ACK can be included in the HARQ-ACK codebook transmitted within this time unit and sent to the network side device. The legal HARQ-ACK feedback time, optionally, may be reflected as a time offset of a non-negative integer value, used to determine the time unit at which the HARQ-ACK feedback is located. Optionally, the non-numerical feedback time offset (or NNK1) can actually be reflected as a time offset of a negative value in the specification, which cannot be used in practice, such as −1.

G12. Before the network side device provides the available HARQ-ACK feedback time for the target HARQ process, when a first condition is not satisfied, the terminal does not expect the target HARQ process to be scheduled or configured for new shared channel transmission.

The restriction mode can be understood as: before the network side device provides the available HARQ-ACK feedback time for the target HARQ process, when a first condition is not satisfied, new shared channel transmission is not scheduled or configured for the target HARQ process. That is to say, before the network side device provides the available HARQ-ACK feedback time for the target HARQ process, when a first condition is not satisfied, if new shared channel transmission is scheduled or configured for the target HARQ process, it is an error case.

That is to say, in this case, if the network side device does not provide a specific HARQ-ACK feedback time for this HARQ process/the shared channel transmission corresponding to this HARQ process, when the first condition is not satisfied, the terminal does not expect the target HARQ process to be scheduled or configured for new shared channel transmission (that is, does not allow the network to schedule or configure it in this way), but when or after the first condition is satisfied, the target HARQ process is allowed to be scheduled or configured for the new shared channel transmission, that is, the network side device can schedule or configure the new shared channel transmission for the target HARQ process. In this case, the terminal performs corresponding receive operations.

Optionally, there is no restriction on whether the new shared channel transmission scheduled or configured by the network side device for the target HARQ process meets the foregoing first condition. However, when the new shared channel transmission scheduled or configured for the target HARQ process does not meet the foregoing first condition, the terminal can ignore this new shared channel transmission.

Optionally, the first condition is that: a start moment at which the target HARQ process is scheduled or configured for new shared channel transmission is after an end moment of a first shared channel transmission, or after an end moment of the first shared channel transmission that is offset by a predefined time offset (this situation refers to the situation in which the start moment of the new shared channel transmission scheduled or configured by the target HARQ process is located after the end moment of the first shared channel transmission plus the time corresponding to a predefined time offset).

The first shared channel transmission occupies the target HARQ process, and the DCI that schedules the first shared channel transmission indicates the non-numerical feedback time offset.

The predefined time offset can be specified by the protocol or configured based on high-level signaling. The setting of the predefined time offset can consider PDSCH decoding time or be determined based on N1 in the specification. The N1 can be understood as a minimum time interval between the end moment of the PDSCH and the uplink transmission of the corresponding HARQ-ACK that carries this PDSCH, and the granularity may be a symbol.

It should also be noted that, for example, when a network side device provides a specific HARQ-ACK feedback time for a HARQ process/PDSCH transmission corresponding to the HARQ process, the HARQ process should be further scheduled or configured for a new shared channel transmission (such as be scheduled for a new PDSCH transmission or configured for a new SPS PDSCH transmission) after the specific HARQ-ACK feedback time given by the network side device (last time).

It should be noted that the foregoing is an explanation of how a network side device may not provide a specific HARQ-ACK feedback time for a target HARQ process/shared channel transmission corresponding to the target HARQ process.

Optionally, for an HARQ process or a shared channel transmission that indicates NNK1 or an unavailable HARQ-ACK feedback time (occupying an HARQ process, that is corresponding to this HARQ process), when a specific HARQ-ACK feedback time is given, the corresponding operation in Rel-16 can be followed, including one of the following:

G21. When a dynamic codebook is used, the next downlink scheduling DCI (without indicating NNK1) (that schedules other HARQ process(es)) can provide a specific HARQ-ACK feedback time for this HARQ process/a shared channel transmission corresponding to the HARQ process (that is, the corresponding HARQ-ACK is fed back within the UL slot/sub-slot indicated by the next downlink scheduling DCI).

G22. When an enhanced dynamic codebook is used, the next downlink scheduling DCI (without indicating NNK1), which schedules or triggers the current shared channel group(, and schedules other HARQ process(es)), can provide a specific HARQ-ACK feedback time for this HARQ process/the shared channel transmission corresponding to the HARQ process (that is, the corresponding HARQ-ACK is fed back within the UL slot/sub-slot indicated by the next downlink scheduling DCI).

The current shared channel group is a shared channel group to which the shared channel transmission corresponding to the HARQ process belongs, such as a PDSCH (group) group. The scheduling the current shared channel group can be understood that the shared channel transmission scheduled by the next downlink scheduling DCI belongs to the same shared channel group as the shared channel transmission. The triggering the current shared channel group can be understood as triggering the HARQ-ACK feedback corresponding to the current shared channel group in the next downlink scheduling DCI.

G23. For any configured codebook type, the specific HARQ-ACK feedback time (that is, the corresponding HARQ-ACK is fed back within the UL slot/sub-slot indicated by the DCI format) can be given by the next DCI format that triggers the Type-3 codebook (NNK1 is not allowed to be indicated).

The HARQ process should be further scheduled or configured for a new shared channel transmission after the specific HARQ-ACK feedback time given by the network side device (last time).

It should be noted that this embodiment of this application provides corresponding solutions for the time domain resource assignment, codeword indication, resource assignment related indication domain, non-numerical feedback time offset of Multi-PDSCH/Multi-PUSCH scheduling, thereby ensuring the practicality of the Multi-PDSCH/Multi-PUSCH scheduling scheme and achieving the goal of reducing signaling overhead and/or improving scheduling flexibility.

It should be noted that the scheduling method for a shared channel provided in the embodiment of this application can be executed by a scheduling apparatus for a shared channel, or by a control module used to execute the scheduling method for a shared channel in the scheduling apparatus for a shared channel. In the embodiment of this application, an example in which a scheduling apparatus for a shared channel performs the scheduling method for a shared channel is used to illustrate the scheduling apparatus for a shared channel provided by the embodiment of this application.

As shown in FIG. 3, an embodiment of this application provides a scheduling apparatus 300 for a shared channel, including:

a receiving module 301, configured to receive first downlink control information DCI, where the first DCI is for scheduling transmission of at least one shared channel, and the first DCI includes scheduling information for the at least one shared channel, where the scheduling information includes at least one of the following:

time domain resource assignment information corresponding to the at least one shared channel, codeword indication information, virtual resource block VRB-to-physical resource block PRB mapping information, PRB bundling size indication information, rate matching indication information, zero power channel state information reference signal ZP CSI-RS trigger information, and a non-numerical feedback time offset.

Optionally, before the receiving module 301 receives the first downlink control information DCI, the method further includes:

a configuration receiving module, configured to receive configuration information of a time domain resource assignment table from a network side device, where the configuration information is for configuring a target row in the time domain resource assignment table, and a configuration rule for the target row includes any one of the following:

each time domain resource assignment record in the target row corresponds to a transmission time offset; and each time domain resource assignment record subset in the target row corresponds to a transmission time offset, where the target row is any row in the time domain resource assignment table.

Optionally, in a case that dual codeword transmission is allowed, an indication of the codeword indication information satisfies any one of the following:

using an independent indication domain to indicate an enabled state of each codeword; and using a first value combination of a first indication domain to indicate an enabled state of each codeword.

Optionally, in a case that the independent indication domain is used to indicate the enabled state of each codeword, the indication of the codeword indication information satisfies one of the following:

the independent indication domain is used to indicate an enabled state of each codeword of the at least one shared channel scheduled by the first DCI; and the independent indication domain respectively indicates an enabled state of each codeword of each shared channel scheduled by the first DCI.

Optionally, in a case that the first value combination of the first indication domain is used to indicate the enabled state of each codeword, the enabled state of each codeword is determined by using one of the following rules:

when each transport block TB of each shared channel scheduled by the first DCI corresponds to two redundant version RV indication bits, if a first modulation and coding scheme MCS index corresponding to a first target TB is a preset MCS index and a first RV index corresponding to the first target TB is a preset RV index, the first target TB is determined to be in a disabled state;

when each TB of each shared channel scheduled by the first DCI corresponds to an RV indication bit, if a second MCS index corresponding to a second target TB is a preset MCS index and a second RV index corresponding to the second target TB is one of two RV index values corresponding to the RV indication bit, the second target TB is determined to be in a disabled state; and when each TB of each shared channel scheduled by the first DCI corresponds to an RV indication bit, if a third MCS index corresponding to a third target TB is a preset MCS index, a third RV index corresponding to the third target TB is one of two RV index values corresponding to the RV indication bit, and a value of a second indication domain corresponding to the third target TB satisfies a preset condition, the third target TB is determined to be in a disabled state, where the first target TB, the second target TB, and the third target TB are any TB corresponding to any shared channel scheduled by the first DCI.

Optionally, the second indication domain includes a new data indicator NDI indication domain corresponding to the third target TB, and the preset condition includes one of the following:

the NDI indication domain is a preset value; and a value of the NDI indication domain is reversed or not reversed relative to an NDI value before a first HARQ process, where the first HARQ process is an HARQ process occupied by the shared channel corresponding to the third target TB.

Optionally, when the terminal supports a resource allocation type 1 and supports interleaved VRB-to-PRB mapping, an indication of the VRB-to-PRB mapping information includes one of the following:

the first DCI includes a plurality of indication domains, and each indication domain respectively indicates VRB-to-PRB mapping information corresponding to a scheduled shared channel;

the first DCI includes an indication domain, and the indication domain is used to indicate VRB-to-PRB mapping information corresponding to a target shared channel in a scheduled shared channel set; and the first DCI includes an indication domain, and VRB-to-PRB mapping information indicated by the indication domain is applied to each scheduled channel.

Optionally, in a case that dynamic PRB bundling is used, an indication of the PRB bundling size indication information includes one of the following:

the first DCI includes a plurality of indication domains, and each indication domain respectively indicates a PRB bundling size corresponding to a scheduled shared channel;

the first DCI includes an indication domain, and the indication domain is used to indicate a PRB bundling size corresponding to a target shared channel in a scheduled shared channel set; and the first DCI includes an indication domain, and a PRB bundling size indicated by the indication domain is applied to each scheduled shared channel.

Optionally, when it is necessary to dynamically indicate whether a resource set corresponding to a rate match pattern group 1 and/or a rate match pattern group 2 can be used for shared channel transmission, an indication of the rate matching indication information includes one of the following:

the first DCI includes a plurality of indication domains, and each indication domain respectively indicates rate matching indication information corresponding to a scheduled shared channel;

the first DCI includes an indication domain, and the indication domain is used to indicate rate matching indication information corresponding to a target shared channel in a scheduled shared channel set; and the first DCI includes an indication domain, and rate matching indication information indicated by the indication domain is applied to each scheduled shared channel.

Optionally, in a case that it is necessary to dynamically indicate an aperiodic ZP CSI-RS resource set, an indication of the ZP CSI-RS trigger information includes one of the following:

the first DCI includes an indication domain, and ZP CSI-RS trigger information indicated by the indication domain is applied to one of the following:

a target shared channel in a scheduled shared channel set;

a target time unit in time units occupied by a scheduled shared channel set;

each scheduled shared channel; or each time unit in time units occupied by a scheduled shared channel set.

Optionally, the target time unit is a first time unit, a last time unit, or a time unit of a preset index occupied by the shared channel set scheduled by the first DCI.

Optionally, the target shared channel is a first shared channel, a last shared channel, or a shared channel of a preset index scheduled by the first DCI.

Optionally, in a case that the first DCI includes the non-numerical feedback time offset, for a target HARQ process for which an available hybrid automatic repeat request-acknowledgment HARQ-ACK feedback time is not provided, the terminal follows one of the following use restriction modes:

before the network side device provides the available HARQ-ACK feedback time for the target HARQ process, the terminal does not expect the target HARQ process to be scheduled or configured for new shared channel transmission; and before the network side device provides the available HARQ-ACK feedback time for the target HARQ process, when a first condition is not satisfied, the terminal does not expect the target HARQ process to be scheduled or configured for new shared channel transmission.

Optionally, the first condition is: a start moment at which the target HARQ process is scheduled or configured for new shared channel transmission is after an end moment of a first shared channel transmission, or is after an end moment that offsets the first shared channel transmission by a predefined time offset; and the first shared channel transmission occupies the target HARQ process, and the DCI that schedules the first shared channel transmission indicates the non-numerical feedback time offset.

Optionally, the shared channel includes at least one of the following:

a physical downlink shared channel PDSCH; and a physical uplink shared channel PUSCH.

It should be noted that the first DCI, scheduling the transmission of at least one shared channel, includes scheduling information for the at least one shared channel, at least one of the codeword indication information, the VRB-to-PRB mapping information, the PRB bundling size indication information, the rate matching indication information, the ZP CSI-RS trigger information, and the non-numerical feedback time offset of multiple shared channels is specified, thereby ensuring that the practical application of scheduling for multiple shared channels is not affected.

The scheduling apparatus for a shared channel in this embodiment of this application may be an apparatus, an apparatus or an electronic device with an operating system, or a component, an integrated circuit, or a chip in a terminal. The apparatus or the electronic device may be a mobile terminal or may be a non-mobile terminal. For example, the mobile terminal may include, but is not limited to, the types of terminal 11 listed above, and the non mobile terminal may be a server, a network attached storage (Network Attached Storage, NAS), a personal computer (Personal Computer, PC), a television (Television, TV), a teller machine, or a self-service machine, and the like, and the embodiments of this application are not specifically specified.

The scheduling apparatus for a shared channel provided in the embodiments of this application can implement all processes implemented by the method embodiments of FIG. 2, and the same technical effects are achieved. To avoid repetition, details are not described herein again.

An embodiment of this application further provides a terminal, including a processor and a communication interface. The communication interface is configured to receive first downlink control information DCI, where the first DCI is for scheduling transmission of at least one shared channel, and the first DCI includes scheduling information for the at least one shared channel, where the scheduling information includes at least one of the following:

time domain resource assignment information corresponding to the at least one shared channel, codeword indication information, virtual resource block VRB-to-physical resource block PRB mapping information, PRB bundling size indication information, rate matching indication information, zero power channel state information reference signal ZP CSI-RS trigger information, and a non-numerical feedback time offset.

Figures 4, 5, 6:
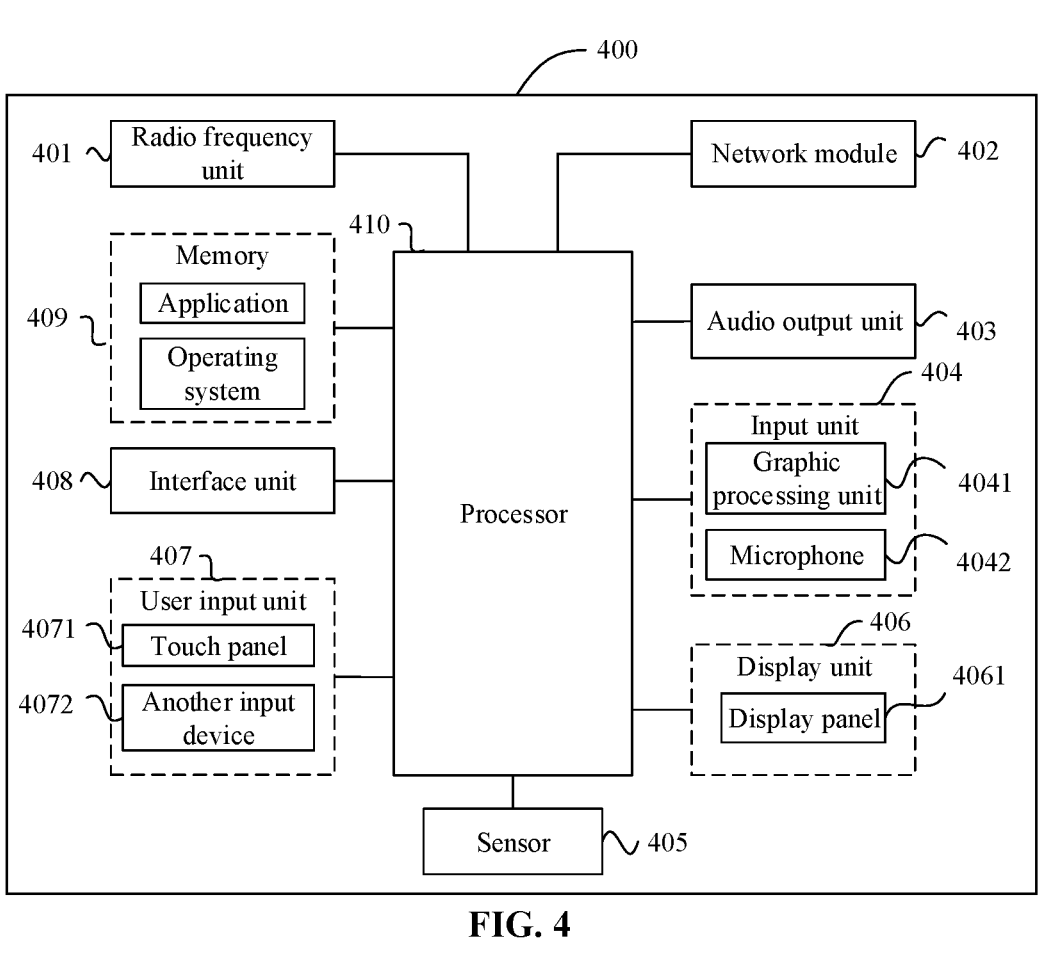
FIG. 4 is a structural block diagram of a terminal according to an embodiment of this application.
FIG. 5 is a second schematic flowchart of a scheduling method for a shared channel according to an embodiment of this application.
FIG. 6 is a second schematic diagram of a module of a scheduling apparatus for a shared channel according to an embodiment of this application.

The terminal embodiment corresponds to the above terminal side method embodiment, and the various implementation processes and implementations of the above method embodiments can be applied to the terminal embodiment, and can achieve the same technical effect. Specifically, FIG. 4 is a schematic diagram of a hardware structure of a terminal that implements the embodiments of this application.

The terminal 400 includes, but is not limited to: at least some components such as a radio frequency unit 401, a network module 402, an audio output unit 403, an input unit 404, a sensor 405, a display unit 406, a user input unit 407, an interface unit 408, a memory 409, and a processor 410.

A person skilled in the art may understand that the terminal 400 further includes a power supply (such as a battery) for supplying power to the components. The power supply may logically connect to the processor 410 by using a power supply management system, thereby implementing functions, such as charging, discharging, and power consumption management, by using the power supply management system. A terminal structure shown in FIG. 4 does not constitute a specification to the terminal, and the terminal may include more or fewer components than those shown in the figure, or some components may be combined, or a different component deployment may be used. Details are not described herein again.

It should be understood that, in this embodiment of this application, the input unit 404 may include a graphics processing unit (Graphics Processing Unit, GPU) 4041 and a microphone 4042. The graphics processing unit 4041 performs processing on image data of a static picture or a video that is obtained by an image acquisition apparatus (for example, a camera) in a video acquisition mode or an image acquisition mode. The display unit 406 may include a display panel 4061, for example, the display panel 4061 may be configured in a form such as a liquid crystal display or an organic light-emitting diode. The user input unit 407 includes a touch panel 4071 and another input device 4072. The touch panel 4071 is also referred to as a touch screen. The touch panel 4071 may include two parts: a touch detection apparatus and a touch controller. The another input device 4072 may include, but is not limited to, a physical keyboard, a functional key (such as a volume control key or a switch key), a track ball, a mouse, and a joystick, and details are not described herein again.

In this embodiment of this application, the radio frequency unit 401 receives downlink data from a network side device and transmits downlink data to the processor 410 for processing. In addition, uplink data is transmitted to the network side device. Generally, the radio frequency unit 401 includes, but is not limited to, an antenna, at least one amplifier, a transceiver, a coupler, a low noise amplifier, a duplexer, and the like.

The memory 409 may be configured to store a software program or instruction and various data. The memory 409 may mainly include a program or instruction storage region and a data storage region. The program or instruction storage region may store an operating system, an application program or instruction required by at least one function (for example, a sound playback function and an image playback function), or the like. The memory 409 may include a high speed random access memory, and may also include a non-volatile memory. The nonvolatile memory may be a read-only memory (read-only memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. For example, the nonvolatile memory may be at least one magnetic disk storage device, a flash memory device, or other volatile solid-state storage devices.

The processor 410 may include one or more processing units. Optionally, the processor 410 may integrate an application processor and a modem. The application processor mainly processes an operating system, a user interface, an application program or instruction, and the like. The modem mainly processes wireless communication, such as a baseband processor. It may be understood that the modem processor may not be integrated into the processor 410.

The radio frequency unit 401 is configured to:

receive first downlink control information DCI, where the first DCI is for scheduling transmission of at least one shared channel, and the first DCI includes scheduling information for the at least one shared channel, where the scheduling information includes at least one of the following:

time domain resource assignment information corresponding to the at least one shared channel, codeword indication information, virtual resource block VRB-to-physical resource block PRB mapping information, PRB bundling size indication information, rate matching indication information, zero power channel state information reference signal ZP CSI-RS trigger information, and a non-numerical feedback time offset.

in embodiments of this application, the first DCI, scheduling the transmission of at least one shared channel, includes scheduling information for the at least one shared channel, at least one of the codeword indication information, the VRB-to-PRB mapping information, the PRB bundling size indication information, the rate matching indication information, the ZP CSI-RS trigger information, and the non-numerical feedback time offset of multiple shared channels is specified by the terminal, thereby ensuring that the practical application of scheduling for multiple shared channels is not affected.

Optionally, before the receiving, by the radio frequency unit 401, first downlink control information DCI, the radio frequency unit 401 is further configured to:

receive configuration information of a time domain resource assignment table from a network side device, where the configuration information is for configuring a target row in the time domain resource assignment table, and a configuration rule for the target row includes any one of the following:

each time domain resource assignment record in the target row corresponds to a transmission time offset; and each time domain resource assignment record subset in the target row corresponds to a transmission time offset, where the target row is any row in the time domain resource assignment table.

Optionally, in a case that dual codeword transmission is allowed, an indication of the codeword indication information satisfies any one of the following:

using an independent indication domain to indicate an enabled state of each codeword; and using a first value combination of a first indication domain to indicate an enabled state of each codeword.

Optionally, in a case that the independent indication domain is used to indicate the enabled state of each codeword, the indication of the codeword indication information satisfies one of the following:

the independent indication domain is used to indicate an enabled state of each codeword of the at least one shared channel scheduled by the first DCI; and the independent indication domain respectively indicates an enabled state of each codeword of each shared channel scheduled by the first DCI.

Optionally, in a case that the first value combination of the first indication domain is used to indicate the enabled state of each codeword, the enabled state of each codeword is determined by using one of the following rules:

when each transport block TB of each shared channel scheduled by the first DCI corresponds to two redundant version RV indication bits, if a first modulation and coding scheme MCS index corresponding to a first target TB is a preset MCS index and a first RV index corresponding to the first target TB is a preset RV index, the first target TB is determined to be in a disabled state;

when each TB of each shared channel scheduled by the first DCI corresponds to an RV indication bit, if a second MCS index corresponding to a second target TB is a preset MCS index and a second RV index corresponding to the second target TB is one of two RV index values corresponding to the RV indication bit, the second target TB is determined to be in a disabled state; and when each TB of each shared channel scheduled by the first DCI corresponds to an RV indication bit, if a third MCS index corresponding to a third target TB is a preset MCS index, a third RV index corresponding to the third target TB is one of two RV index values corresponding to the RV indication bit, and a value of a second indication domain corresponding to the third target TB satisfies a preset condition, the third target TB is determined to be in a disabled state, where the first target TB, the second target TB, and the third target TB are any TB corresponding to any shared channel scheduled by the first DCI.

Optionally, the second indication domain includes a new data indicator NDI indication domain corresponding to the third target TB, and the preset condition includes one of the following:

the NDI indication domain is a preset value; and a value of the NDI indication domain is reversed or not reversed relative to an NDI value before a first HARQ process, where the first HARQ process is an HARQ process occupied by the shared channel corresponding to the third target TB.

Optionally, when the terminal supports a resource allocation type 1 and supports interleaved VRB-to-PRB mapping, an indication of the VRB-to-PRB mapping information includes one of the following:

the first DCI includes a plurality of indication domains, and each indication domain respectively indicates VRB-to-PRB mapping information corresponding to a scheduled shared channel;

the first DCI includes an indication domain, and the indication domain is used to indicate VRB-to-PRB mapping information corresponding to a target shared channel in a scheduled shared channel set; and the first DCI includes an indication domain, and VRB-to-PRB mapping information indicated by the indication domain is applied to each scheduled shared channel.

Optionally, in a case that dynamic PRB bundling is used, an indication of the PRB bundling size indication information includes one of the following:

the first DCI includes a plurality of indication domains, and each indication domain respectively indicates a PRB bundling size corresponding to a scheduled shared channel;

the first DCI includes an indication domain, and the indication domain is used to indicate a PRB bundling size corresponding to a target shared channel in a scheduled shared channel set; and the first DCI includes an indication domain, and a PRB bundling size indicated by the indication domain is applied to each scheduled shared channel.

Optionally, when it is necessary to dynamically indicate whether a resource set corresponding to a rate match pattern group 1 and/or a rate match pattern group 2 can be used for shared channel transmission, an indication of the rate matching indication information includes one of the following:

the first DCI includes a plurality of indication domains, and each indication domain respectively indicates rate matching indication information corresponding to a scheduled shared channel;

the first DCI includes an indication domain, and the indication domain is used to indicate rate matching indication information corresponding to a target shared channel in a scheduled shared channel set; and the first DCI includes an indication domain, and rate matching indication information indicated by the indication domain is applied to each scheduled shared channel.

Optionally, in a case that it is necessary to dynamically indicate an aperiodic ZP CSI-RS resource set, an indication of the ZP CSI-RS trigger information includes one of the following:

the first DCI includes an indication domain, and ZP CSI-RS trigger information indicated by the indication domain is applied to one of the following:

a target shared channel in a scheduled shared channel set;

a target time unit in time units occupied by a scheduled shared channel set;

each scheduled shared channel; or each time unit in time units occupied by a scheduled shared channel set.

Optionally, the target time unit is a first time unit, a last time unit, or a time unit of a preset index occupied by the shared channel set scheduled by the first DCI.

Optionally, the target shared channel is a first shared channel, a last shared channel, or a shared channel of a preset index scheduled by the first DCI.

Optionally, in a case that the first DCI includes the non-numerical feedback time offset, for a target HARQ process for which an available hybrid automatic repeat request-acknowledgment HARQ-ACK feedback time is not provided, the terminal follows one of the following use restriction modes:

before the network side device provides the available HARQ-ACK feedback time for the target HARQ process, the terminal does not expect the target HARQ process to be scheduled or configured for new shared channel transmission; and before the network side device provides the available HARQ-ACK feedback time for the target HARQ process, when a first condition is not satisfied, the terminal does not expect the target HARQ process to be scheduled or configured for new shared channel transmission.

Optionally, the first condition is: a start moment at which the target HARQ process is scheduled or configured for new shared channel transmission is after an end moment of a first shared channel transmission, or is after an end moment that offsets the first shared channel transmission by a predefined time offset; and the first shared channel transmission occupies the target HARQ process, and the DCI that schedules the first shared channel transmission indicates the non-numerical feedback time offset.

Optionally, the shared channel includes at least one of the following:

a physical downlink shared channel PDSCH; and a physical uplink shared channel PUSCH.

Preferably, an embodiment of this application further provides a terminal, including a processor, a memory, and a program or instructions stored on the memory and executable on the processor. The program or instructions, when executed by the processor, implements all processes of the embodiments of the scheduling method for a shared channel, and can achieve the same technical effects. To avoid repetition, details are not described herein again.

An embodiment of this application further provides a readable storage medium, storing a program or instructions. The program or instructions, when executed by a processor, implements all processes of the embodiments of the scheduling method for a shared channel, and can achieve the same technical effects. To avoid repetition, details are not described herein again. The computer-readable storage medium is, for example, a read-only memory (Read-Only Memory, ROM), a random access memory (Random Access Memory, RAM), a magnetic disk, or an optical disc.

As shown in FIG. 5, an embodiment of this application further provides a scheduling method for a shared channel, including:

Step 501: A network side device sends first downlink control information DCI, where the first DCI is for scheduling transmission of at least one shared channel, and the first DCI includes scheduling information for the at least one shared channel.

The scheduling information includes at least one of the following:

time domain resource assignment information corresponding to the at least one shared channel, an index of the shared channel in a time domain resource assignment table for the first DCI scheduling, codeword indication information, virtual resource block VRB-to-physical resource block PRB mapping information, PRB bundling size indication information, rate matching indication information, zero power channel state information reference signal ZP CSI-RS trigger information, and a non-numerical feedback time offset.

Optionally, before the receiving, by a network side device, first downlink control information DCI, the method further includes:

sending, by the network side device, configuration information of a time domain resource assignment table to a terminal, where the configuration information is for configuring a target row in the time domain resource assignment table, and a configuration rule for the target row includes any one of the following:

each time domain resource assignment record in the target row corresponds to a feedback transmission time offset; and each time domain resource assignment record subset in the target row corresponds to a feedback transmission time offset, where the target row is any row in the time domain resource assignment table.

Optionally, in a case that dual codeword transmission is allowed, an indication of the codeword indication information satisfies any one of the following:

using an independent indication domain to indicate an enabled state of each codeword; and using a first value combination of a first indication domain to indicate an enabled state of each codeword.

Optionally, in a case that the independent indication domain is used to indicate the enabled state of each codeword, the indication of the codeword indication information satisfies one of the following:

the independent indication domain is used to indicate an enabled state of each codeword of the at least one shared channel scheduled by the first DCI; and the independent indication domain respectively indicates an enabled state of each codeword of each shared channel scheduled by the first DCI.

Optionally, in a case that the first value combination of the first indication domain is used to indicate the enabled state of each codeword, the enabled state of each codeword is determined by using one of the following rules:

when each transport block TB of each shared channel scheduled by the first DCI corresponds to two redundant version RV indication bits, if a first modulation and coding scheme MCS index corresponding to a first target TB is a preset MCS index and a first RV index corresponding to the first target TB is a preset RV index, the first target TB is determined to be in a disabled state;

when each TB of each shared channel scheduled by the first DCI corresponds to an RV indication bit, if a second MCS index corresponding to a second target TB is a preset MCS index and a second RV index corresponding to the second target TB is one of two RV index values corresponding to the RV indication bit, the second target TB is determined to be in a disabled state; and when each TB of each shared channel scheduled by the first DCI corresponds to an RV indication bit, if a third MCS index corresponding to a third target TB is a preset MCS index, a third RV index corresponding to the third target TB is one of two RV index values corresponding to the RV indication bit, and a value of a second indication domain corresponding to the third target TB satisfies a preset condition, the third target TB is determined to be in a disabled state, where the first target TB, the second target TB, and the third target TB are any TB corresponding to any shared channel scheduled by the first DCI.

Optionally, the second indication domain includes a new data indicator NDI indication domain corresponding to the third target TB, and the preset condition includes one of the following:

the NDI indication domain is a preset value; and a value of the NDI indication domain is reversed or not reversed relative to an NDI value before a first HARQ process, where the first HARQ process is an HARQ process occupied by the shared channel corresponding to the third target TB.

Optionally, when the terminal supports a resource allocation type 1 and supports interleaved VRB-to-PRB mapping, an indication of the VRB-to-PRB mapping information includes one of the following:

the first DCI includes a plurality of indication domains, and each indication domain respectively indicates VRB-to-PRB mapping information corresponding to a scheduled shared channel;

the first DCI includes an indication domain, and the indication domain is used to indicate VRB-to-PRB mapping information corresponding to a target shared channel in a scheduled shared channel set; and the first DCI includes an indication domain, and VRB-to-PRB mapping information indicated by the indication domain is applied to each scheduled shared channel.

Optionally, in a case that dynamic PRB bundling is used, an indication of the PRB bundling size indication information includes one of the following:

the first DCI includes a plurality of indication domains, and each indication domain respectively indicates a PRB bundling size corresponding to a scheduled shared channel;

the first DCI includes an indication domain, and the indication domain is used to indicate a PRB bundling size corresponding to a target shared channel in a scheduled shared channel set; and the first DCI includes an indication domain, and a PRB bundling size indicated by the indication domain is applied to each scheduled shared channel.

Optionally, when it is necessary to dynamically indicate whether a resource set corresponding to a rate match pattern group 1 and/or a rate match pattern group 2 can be used for shared channel transmission, an indication of the rate matching indication information includes one of the following:

the first DCI includes a plurality of indication domains, and each indication domain respectively indicates rate matching indication information corresponding to a scheduled shared channel;

the first DCI includes an indication domain, and the indication domain is used to indicate rate matching indication information corresponding to a target shared channel in a scheduled shared channel set; and the first DCI includes an indication domain, and rate matching indication information indicated by the indication domain is applied to each scheduled shared channel.

Optionally, in a case that it is necessary to dynamically indicate an aperiodic ZP CSI-RS resource set, an indication of the ZP CSI-RS trigger information includes one of the following:

the first DCI includes an indication domain, and ZP CSI-RS trigger information indicated by the indication domain is applied to one of the following:

a target shared channel in a scheduled shared channel set;

a target time unit in time units occupied by a scheduled shared channel set;

each scheduled shared channel; or each time unit in time units occupied by a scheduled shared channel set.

Optionally, the target time unit is a first time unit, a last time unit, or a time unit of a preset index occupied by the shared channel set scheduled by the first DCI.

Optionally, the target shared channel is a first shared channel, a last shared channel, or a shared channel of a preset index scheduled by the first DCI.

Optionally, in a case that the first DCI includes the non-numerical feedback time offset, for a target HARQ process for which an available hybrid automatic repeat request acknowledgment HARQ-ACK feedback time is not provided, the network side device follows one of the following use restriction modes:

before the available HARQ-ACK feedback time is not provided for the target HARQ process, the target HARQ process is not scheduled or configured for new shared channel transmission; and before the available HARQ-ACK feedback time is not provided for the target HARQ process, when a first condition is satisfied, the target HARQ process is allowed to be scheduled or configured for new shared channel transmission.

Optionally, the first condition is: a start moment at which the target HARQ process is scheduled or configured for new shared channel transmission is after an end moment of a first shared channel transmission, or is after an end moment that offsets the first shared channel transmission by a predefined time offset; and the first shared channel transmission occupies the target HARQ process, and the DCI that schedules the first shared channel transmission indicates the non-numerical feedback time offset.

Optionally, the shared channel includes at least one of the following:

a physical downlink shared channel PDSCH; and a physical uplink shared channel PUSCH.

It should be noted that all descriptions of the network side device in the foregoing embodiments are applicable to the embodiments of the scheduling method for a shared channel applied to the network side device side, and can also achieve the same technical effect.

It should be noted that in embodiments of this application, the first DCI, scheduling the transmission of at least one shared channel, includes scheduling information for the at least one shared channel, at least one of the codeword indication information, the VRB to PRB mapping information, the PRB bundling size indication information, the rate matching indication information, the ZP CSI-RS trigger information, and the non-numerical feedback time offset of multiple shared channels is specified, thereby ensuring that the practical application of scheduling for multiple shared channels is not affected.

As shown in FIG. 6, an embodiment of this application further provides a scheduling apparatus 600 for a shared channel, including:

a sending module 601, configured to send first downlink control information DCI, where the first DCI is for scheduling transmission of at least one shared channel, and the first DCI includes scheduling information for the at least one shared channel, where the scheduling information includes at least one of the following:

time domain resource assignment information corresponding to the at least one shared channel, an index of the shared channel in a time domain resource assignment table for the first DCI scheduling, codeword indication information, virtual resource block VRB-to-physical resource block PRB mapping information, PRB bundling size indication information, rate matching indication information, zero power channel state information reference signal ZP CSI-RS trigger information, and a non-numerical feedback time offset.

Optionally, before the receiving, by a network side device, first downlink control information DCI, the method further includes:

a configuration sending module, configured to send configuration information of a time domain resource assignment table to a terminal, where the configuration information is for configuring a target row in the time domain resource assignment table, and a configuration rule for the target row includes any one of the following:

each time domain resource assignment record in the target row corresponds to a feedback transmission time offset; and each time domain resource assignment record subset in the target row corresponds to a feedback transmission time offset, where the target row is any row in the time domain resource assignment table.

Optionally, in a case that dual codeword transmission is allowed, an indication of the codeword indication information satisfies any one of the following:

using an independent indication domain to indicate an enabled state of each codeword; and using a first value combination of a first indication domain to indicate an enabled state of each codeword.

Optionally, in a case that the independent indication domain is used to indicate the enabled state of each codeword, the indication of the codeword indication information satisfies one of the following:

the independent indication domain is used to indicate an enabled state of each codeword of the at least one shared channel scheduled by the first DCI; and the independent indication domain respectively indicates an enabled state of each codeword of each shared channel scheduled by the first DCI.

Optionally, in a case that the first value combination of the first indication domain is used to indicate the enabled state of each codeword, the enabled state of each codeword is determined by using one of the following rules:

when each transport block TB of each shared channel scheduled by the first DCI corresponds to two redundant version RV indication bits, if a first modulation and coding scheme MCS index corresponding to a first target TB is a preset MCS index and a first RV index corresponding to the first target TB is a preset RV index, the first target TB is determined to be in a disabled state;

when each TB of each shared channel scheduled by the first DCI corresponds to an RV indication bit, if a second MCS index corresponding to a second target TB is a preset MCS index and a second RV index corresponding to the second target TB is one of two RV index values corresponding to the RV indication bit, the second target TB is determined to be in a disabled state; and when each TB of each shared channel scheduled by the first DCI corresponds to an RV indication bit, if a third MCS index corresponding to a third target TB is a preset MCS index, a third RV index corresponding to the third target TB is one of two RV index values corresponding to the RV indication bit, and a value of a second indication domain corresponding to the third target TB satisfies a preset condition, the third target TB is determined to be in a disabled state, where the first target TB, the second target TB, and the third target TB are any TB corresponding to any shared channel scheduled by the first DCI.

Optionally, the second indication domain includes a new data indicator NDI indication domain corresponding to the third target TB, and the preset condition includes one of the following:

the NDI indication domain is a preset value; and a value of the NDI indication domain is reversed or not reversed relative to an NDI value before a first HARQ process, where the first HARQ process is an HARQ process occupied by the shared channel corresponding to the third target TB.

Optionally, when the terminal supports a resource allocation type 1 and supports interleaved VRB-to-PRB mapping, an indication of the VRB-to-PRB mapping information includes one of the following:

the first DCI includes a plurality of indication domains, and each indication domain respectively indicates VRB-to-PRB mapping information corresponding to a scheduled shared channel;

the first DCI includes an indication domain, and the indication domain is used to indicate VRB-to-PRB mapping information corresponding to a target shared channel in a scheduled shared channel set; and the first DCI includes an indication domain, and VRB-to-PRB mapping information indicated by the indication domain is applied to each scheduled shared channel.

Optionally, in a case that dynamic PRB bundling is used, an indication of the PRB bundling size indication information includes one of the following:

the first DCI includes a plurality of indication domains, and each indication domain respectively indicates a PRB bundling size corresponding to a scheduled shared channel;

the first DCI includes an indication domain, and the indication domain is used to indicate a PRB bundling size corresponding to a target shared channel in a scheduled shared channel set; and the first DCI includes an indication domain, and a PRB bundling size indicated by the indication domain is applied to each scheduled shared channel.

Optionally, when it is necessary to dynamically indicate whether a resource set corresponding to a rate match pattern group 1 and/or a rate match pattern group 2 can be used for shared channel transmission, an indication of the rate matching indication information includes one of the following:

the first DCI includes a plurality of indication domains, and each indication domain respectively indicates rate matching indication information corresponding to a scheduled shared channel;

the first DCI includes an indication domain, and the indication domain is used to indicate rate matching indication information corresponding to a target shared channel in a scheduled shared channel set; and the first DCI includes an indication domain, and rate matching indication information indicated by the indication domain is applied to each scheduled shared channel.

Optionally, in a case that it is necessary to dynamically indicate an aperiodic ZP CSI-RS resource set, an indication of the ZP CSI-RS trigger information includes one of the following:

the first DCI includes an indication domain, and ZP CSI-RS trigger information indicated by the indication domain is applied to one of the following:

a target shared channel in a scheduled shared channel set;

a target time unit in time units occupied by a scheduled shared channel set;

each scheduled shared channel; or each time unit in time units occupied by a scheduled shared channel set.

Optionally, the target time unit is a first time unit, a last time unit, or a time unit of a preset index occupied by the shared channel set scheduled by the first DCI.

Optionally, the target shared channel is a first shared channel, a last shared channel, or a shared channel of a preset index scheduled by the first DCI.

Optionally, in a case that the first DCI includes the non-numerical feedback time offset, for a target HARQ process for which an available hybrid automatic repeat request acknowledgment HARQ-ACK feedback time is not provided, the network side device follows one of the following use restriction modes:

before the available HARQ-ACK feedback time is not provided for the target HARQ process, the target HARQ process is not scheduled or configured for new shared channel transmission; and before the available HARQ-ACK feedback time is not provided for the target HARQ process, when a first condition is satisfied, the target HARQ process is allowed to be scheduled or configured for new shared channel transmission.

Optionally, the first condition is: a start moment at which the target HARQ process is scheduled or configured for new shared channel transmission is after an end moment of a first shared channel transmission, or is after an end moment that offsets the first shared channel transmission by a predefined time offset; and the first shared channel transmission occupies the target HARQ process, and the DCI that schedules the first shared channel transmission indicates the non-numerical feedback time offset.

Optionally, the shared channel includes at least one of the following:

a physical downlink shared channel PDSCH; and a physical uplink shared channel PUSCH.

It should be noted that the apparatus embodiment is an apparatus corresponding to the foregoing method embodiment one by one, and all implementations of the foregoing method embodiment can be applied to the apparatus embodiment, and can achieve the same technical effect.

Preferably, an embodiment of this application further provides a network side device, including a processor, a memory, and a program or instructions stored on the memory and executable on the processor. The program or the instructions, when executed by the processor, implements all processes of the embodiments of the foregoing scheduling method for a shared channel applied to the network side device, and can achieve the same technical effects. To avoid repetition, details are not described herein again.

An embodiment of this application further provides a readable storage medium, storing a program or instructions. The program or the instructions, when executed by a processor, implements all processes of the embodiments of the scheduling method for a shared channel applied to a network side device, and can achieve the same technical effects. To avoid repetition, details are not described herein again.

The computer-readable storage medium is, for example, a read-only memory (Read-Only Memory, ROM), a random access memory (Random Access Memory, RAM), a magnetic disk, or an optical disc.

An embodiment of this application further provides a network side device, including a processor and a communication interface. The communication interface is configured to send first downlink control information DCI, where the first DCI is for scheduling transmission of at least one shared channel, and the first DCI includes scheduling information for the at least one shared channel, where the scheduling information includes at least one of the following:

time domain resource assignment information corresponding to the at least one shared channel, an index of the shared channel in a time domain resource assignment table for the first DCI scheduling, codeword indication information, virtual resource block VRB-to-physical resource block PRB mapping information, PRB bundling size indication information, rate matching indication information, zero power channel state information reference signal ZP CSI-RS trigger information, and a non-numerical feedback time offset.

The network side device embodiment corresponds to the foregoing network side device method embodiment, and the various implementation processes and implementations of the foregoing method embodiments can be applied to the network side device embodiment, and can achieve the same technical effect.

Figures 7, 8:
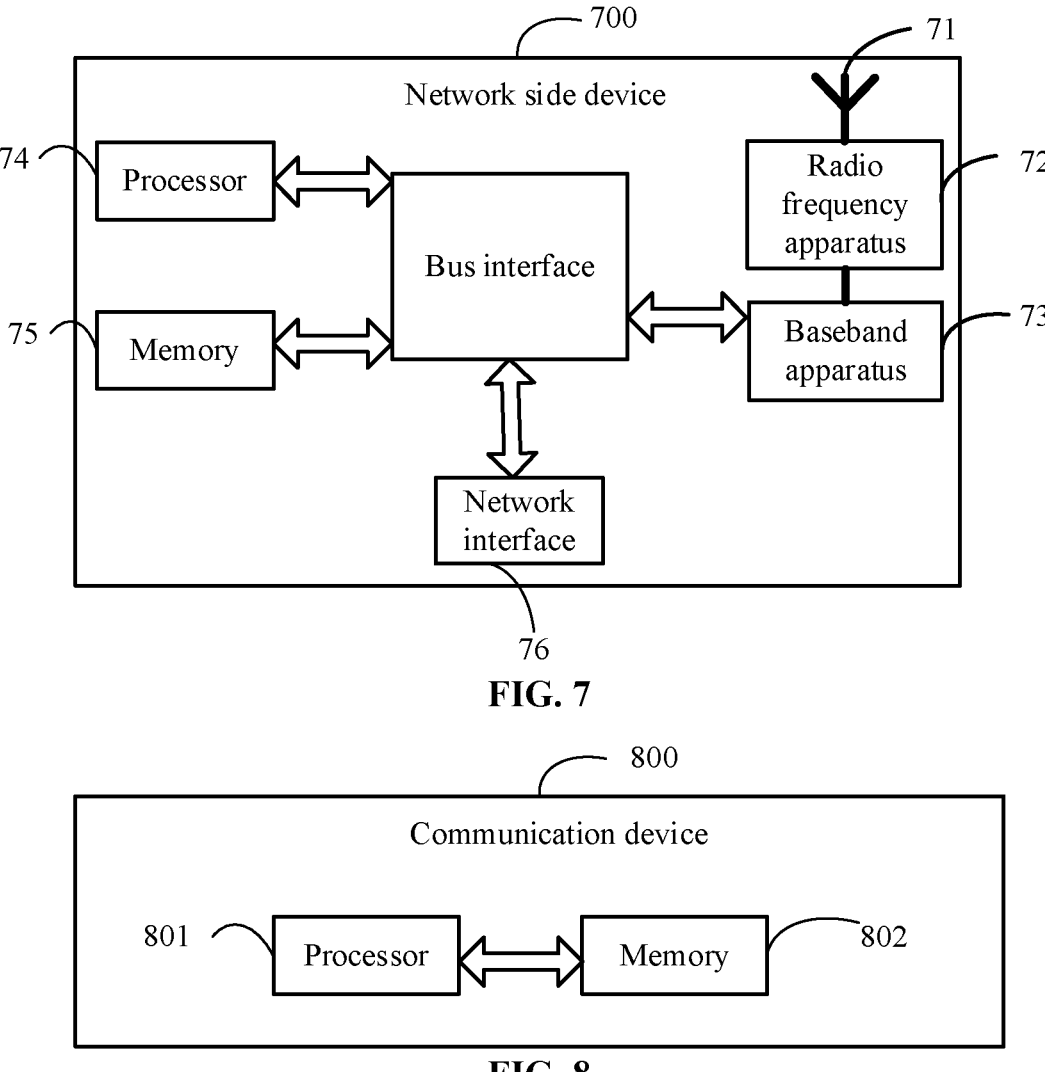
FIG. 7 is a structural block diagram of a network side device according to an embodiment of this application.
FIG. 8 is a structural block diagram of a communication device according to an embodiment of this application.

Specifically, an embodiment of this application further provides a network side device. As shown in FIG. 7, a network side device 700 includes: an antenna 71, a radio frequency apparatus 72, and a baseband apparatus 73. The antenna 71 is connected to the radio frequency apparatus 72.

In an uplink direction, the radio frequency apparatus 72 receives information by using the antenna 71, and sends the received information to the baseband apparatus 73 for processing. In a downlink direction, the baseband apparatus 73 processes to-be-sent information, and sends the information to the radio frequency apparatus 72. The radio frequency apparatus 72 processes the information and sends the information by using the antenna 71.

The foregoing frequency band processing apparatus can be located in the baseband apparatus 73, and the method executed by the network side device in the foregoing embodiment can be implemented in the baseband apparatus 73. The baseband apparatus 73 includes a processor 74 and a memory 75.

The baseband apparatus 73 may include, for example, at least one baseband plate. A plurality of chips are disposed on the baseband plate. As shown in FIG. 7, one of the plurality of chips is, for example, the processor 74, and is connected to the memory 75, to invoke a program in the memory 75 to perform operations of the network side device in the foregoing method embodiment.

The baseband apparatus 73 may further include a network interface 76, configured to exchange information with the radio frequency apparatus 72. The interface is, for example, a common public radio interface (Common Public Radio Interface, CPRI).

Specifically, the network side device of this embodiment of this application further includes: the instructions or a program stored in the memory 75 and executable on the processor 74. The processor 74 invokes the instructions or the program in the memory 75 to execute the methods executed by each module shown in FIG. 6, and can achieve the same technical effects. To avoid repetition, details are not described herein again.

Optionally, as shown in FIG. 8, an embodiment of this application further provides a communication device 800, including a processor 801, a memory 802, and a program or instructions stored on the memory 802 and executable on the processor 801. For example, when the communication device 800 is a terminal, the program or the instructions, when executed by the processor 801, implements all processes of the embodiments of the scheduling method for a shared channel applied to the terminal, and can achieve the same technical effects. When the communication device 800 is a network side device, the program or the instructions, when executed by the processor 801, implements all processes of the embodiments of the scheduling method for a shared channel applied to the network side device, and can achieve the same technical effects. To avoid repetition, details are not described herein again.

A terminal mentioned in the embodiments of this application may refer to a device that provides a user with voice and/or data connectivity, a handheld device with a radio connection function, or another processing device connected to a wireless modem. In different systems, names of the terminal device may also vary. For example, in a 5G system, the terminal device can be referred to as a user equipment (User Equipment, UE). A wireless terminal device may communicate with one or more core networks (Core Networks, CNs) through a radio access network (Radio Access Network, RAN). The wireless terminal device may be a mobile terminal device, such as a mobile phone (also referred to as a "cellular" phone) and a computer with a mobile terminal device, for example, may be a portable, pocket-sized, handheld, computer built-in, or in-vehicle mobile apparatus, which exchanges voice and/or data with the radio access network. For example, the wireless terminal device may be a device such as a personal communication service (Personal Communication Service, PCS) phone, a cordless phone, a Session Initiated Protocol (Session Initiated Protocol, SIP) phone, a wireless local loop (Wireless Local Loop, WLL) station, or a personal digital assistant (Personal Digital Assistant, PDA). The wireless terminal device may also be referred to as a system, a subscriber unit (subscriber unit), a subscriber station (subscriber station), a mobile station (mobile station), a mobile (mobile), a remote station (remote station), an access point (access point), a remote terminal (remote terminal) device, an access terminal (access terminal) device, a user terminal (user terminal), a user agent (user agent), or a user equipment (user equipment).

For example, the network side device may be a base transceiver station (Base Transceiver Station, BTS) in the Global System of Mobile communication (Global System of Mobile communication, GSM) or Code Division Multiple Access (Code Division Multiple Access, CDMA), or may be a NodeB (NodeB, NB) in a Wideband Code Division Multiple Access (Wideband Code Division Multiple Access, WCDMA), or may be an evolutional NodeB (Evolutional Node B, eNB or eNodeB) in LTE, or may be a relay station or an access point, or may be a base station in a future 5G network, or the like. This is not specified herein.

The network side device and the terminal can each use one or more antennas for multi input multi output (Multi Input Multi Output, MIMO) transmission, and the MIMO may be single user MIMO (Single User MIMO, SU-MIMO) or multiple user MIMO (Multiple User MIMO, MU-MIMO). According to the shape and quantity of antenna combinations, MIMO transmission may be two-dimensional MIMO (2D MIMO), three-dimensional MIMO (3D MIMO), full dimensional MIMO (FD MIMO), or massive-MIMO (massive MIMO), as well as diversity transmission, precoding transmission, beamforming transmission, or the like.

An embodiment of this application further provides a chip, including a processor and a communication interface, where the communication interface is coupled to the processor, and the processor is configured to run a program or instructions, to implement all processes of the foregoing embodiments of the scheduling method for a shared channel, and can achieve the same technical effects. To avoid repetition, details are not described herein again.

It should be understood that, the chip described in the embodiments of this application may also be referred to as a system-level chip, a system chip, a chip system, a system on chip, or the like.

An embodiment of this application further provides a computer program product, where the computer program product is stored in a non-volatile storage medium and executed by at least one processor to implement all processes of the foregoing embodiments of the scheduling method for a shared channel, and can achieve the same technical effects. To avoid repetition, details are not described herein again.

It should be noted that in this specification, "include", "comprise", and any variants are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Without more limitations, elements specified by the sentence "including one" does not exclude that there are still other same elements in the processes, methods, objects, or apparatuses. In addition, it should be noted that, the scope of the method and apparatus in the embodiments of this application is not limited to performing functions in the order shown or discussed, and it may further include performing the functions in a substantially simultaneous manner or in reverse order according to the functions involved. For example, the described method may be performed in a different order than described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions in this application essentially or the part contributing to the related technologies may be implemented in the form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

A person of ordinary skill in the art may notice that the exemplary units and algorithm steps described with reference to the embodiments disclosed in this specification can be implemented in electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the embodiments provided in this application, it should be understood that the disclosed apparatus and method may be implemented in other manners. For example, the described apparatus embodiments are only exemplary. For example, the division of the units is only a logical function division and may be other divisions during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the related technology, all or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The storage medium includes: any medium that can store program code, such as a USB flash drive, a removable hard disk, a ROM, a RAM, a magnetic disk, or an optical disc.

A person skilled in the art may understand that all or some of the procedures of the methods of the foregoing embodiments may be implemented by a computer program controlling relevant hardware. The program may be stored in a computer-readable storage medium. When the program is executed, the procedures of the foregoing method embodiments may be implemented. The storage medium may be a magnetic disk, an optical disk, a ROM/RAM, and the like.

The embodiments of this application are described above with reference to the accompanying drawings, but this application is not limited to the foregoing specific embodiments, which are merely illustrative rather than limited. Under the inspiration of this application, a person of ordinary skill in the art may make various variations without departing from the scope of this application and the protection of the claims, and such variations shall fall within the protection of this application.

What is claimed is:

1. A scheduling method for a shared channel, comprising:
receiving, by a terminal, first downlink control information (DCI), wherein the first DCI is for scheduling transmission of at least one shared channel, and the first DCI comprises scheduling information for the at least one shared channel, wherein
the scheduling information comprises
codeword indication information,
wherein in a case that dual codeword transmission is allowed, the codeword indication information indicates an enabled state of each codeword using a first value combination of a first indication domain,
wherein a second target transport block (TB) is determined to be in a disabled state, in a case that each TB of each shared channel scheduled by the first DCI corresponds to a redundant version (RV) indication bit, a second modulation and coding scheme (MCS) index corresponding to the second target TB is 26 and a second RV index corresponding to the second target TB is 2; and
wherein the second target TB is any TB corresponding to any shared channel scheduled by the first DCI.

2. The method according to claim 1, wherein before the receiving, by a terminal, first DCI, the method further comprises:
receiving configuration information of a time domain resource assignment table from a network side device, wherein the configuration information is for configuring a target row in the time domain resource assignment table, and a configuration rule for the target row comprises any one of the following:

each time domain resource assignment record in the target row corresponds to a transmission time offset; and each time domain resource assignment record subset in the target row corresponds to a transmission time offset, wherein the target row is any row in the time domain resource assignment table.

3. The method according to claim 1, wherein in a case that the first value combination of the first indication domain is used to indicate the enabled state of each codeword, the enabled state of each codeword is further determined by using one of the following rules:

when each transport block (TB) of each shared channel scheduled by the first DCI corresponds to two redundant version (RV) indication bits, if a first modulation and coding scheme (MCS) index corresponding to a first target TB is a preset MCS index and a first RV index corresponding to the first target TB is a preset RV index, the first target TB is determined to be in a disabled state;

when each TB of each shared channel scheduled by the first DCI corresponds to an RV indication bit, if a second MCS index corresponding to a second target TB is a preset MCS index and a second RV index corresponding to the second target TB is one of two RV index values corresponding to the RV indication bit, the second target TB is determined to be in a disabled state; and when each TB of each shared channel scheduled by the first DCI corresponds to an RV indication bit, if a third MCS index corresponding to a third target TB is a preset MCS index, a third RV index corresponding to the third target TB is one of two RV index values corresponding to the RV indication bit, and a value of a second indication domain corresponding to the third target TB satisfies a preset condition, the third target TB is determined to be in a disabled state, wherein the first target TB, the second target TB, and the third target TB are any TB corresponding to any shared channel scheduled by the first DCI.

4. The method according to claim 1, wherein when the terminal supports a resource allocation type 1 and supports interleaved virtual resource block to physical resource block (VRB-to-PRB) mapping, an indication of the VRB-to-PRB mapping information comprises one of the following:

the first DCI comprises a plurality of indication domains, and each indication domain respectively indicates VRB-to-PRB mapping information corresponding to a scheduled shared channel;

the first DCI comprises an indication domain, and the indication domain is used to indicate VRB-to-PRB mapping information corresponding to a target shared channel in a scheduled shared channel set; and the first DCI comprises an indication domain, and VRB-to-PRB mapping information indicated by the indication domain is applied to each scheduled shared channel.

5. The method according to claim 4, wherein the target shared channel is a first shared channel, a last shared channel, or a shared channel of a preset index scheduled by the first DCI.

6. The method according to claim 1, wherein in a case that dynamic physical resource block (PRB) bundling is used, an indication of the PRB bundling size indication information comprises one of the following:

the first DCI comprises a plurality of indication domains, and each indication domain respectively indicates a PRB bundling size corresponding to a scheduled shared channel;

the first DCI comprises an indication domain, and the indication domain is used to indicate a PRB bundling size corresponding to a target shared channel in a scheduled shared channel set; and the first DCI comprises an indication domain, and a PRB bundling size indicated by the indication domain is applied to each scheduled shared channel.

7. The method according to claim 1, wherein when it is necessary to dynamically indicate whether a resource set corresponding to a rate match pattern group 1 and/or a rate match pattern group 2 can be used for shared channel transmission, an indication of the rate matching indication information comprises one of the following:

the first DCI comprises a plurality of indication domains, and each indication domain respectively indicates rate matching indication information corresponding to a scheduled shared channel;

the first DCI comprises an indication domain, and the indication domain is used to indicate rate matching indication information corresponding to a target shared channel in a scheduled shared channel set; and the first DCI comprises an indication domain, and rate matching indication information indicated by the indication domain is applied to each scheduled shared channel.

8. The method according to claim 1, wherein in a case that it is necessary to dynamically indicate an aperiodic zero power channel state information reference signal (ZP CSI-RS) resource set, an indication of the ZP CSI-RS trigger information comprises one of the following:

the first DCI comprises an indication domain, and ZP CSI-RS trigger information indicated by the indication domain is applied to one of the following:

a target shared channel in a scheduled shared channel set;

a target time unit in time units occupied by a scheduled shared channel set;

each scheduled shared channel; or each time unit in time units occupied by a scheduled shared channel set.

9. The method according to claim 8, wherein the target time unit is a first time unit, a last time unit, or a time unit of a preset index occupied by the shared channel set scheduled by the first DCI.

10. The method according to claim 1, wherein in a case that the first DCI comprises the non-numerical feedback time offset, for a target hybrid automatic repeat request (HARQ) process for which an available hybrid automatic repeat request-acknowledgment (HARQ-ACK) feedback time is not provided, the terminal follows one of the following use restriction modes:

before the network side device provides the available HARQ-ACK feedback time for the target HARQ process, the terminal does not expect the target HARQ process to be scheduled or configured for new shared channel transmission; and before the network side device provides the available HARQ-ACK feedback time for the target HARQ process, when a first condition is not satisfied, the terminal does not expect the target HARQ process to be scheduled or configured for new shared channel transmission.

11. The method according to claim 10, wherein the first condition is: a start moment at which the target HARQ process is scheduled or configured for new shared channel transmission is after an end moment of a first shared channel transmission, or is after an end moment that offsets the first shared channel transmission by a predefined time offset; and the first shared channel transmission occupies the target HARQ process, and the DCI that schedules the first shared channel transmission indicates the non-numerical feedback time offset.

12. The method according to claim 1, wherein the shared channel comprises at least one of the following:

a physical downlink shared channel (PDSCH); and a physical uplink shared channel (PUSCH).

13. A scheduling method for a shared channel, comprising:

sending, by a network side device, first downlink control information (DCI), wherein the first DCI is for scheduling transmission of at least one shared channel, and the first DCI comprises scheduling information for the at least one shared channel, wherein the scheduling information comprises codeword indication information, wherein in a case that dual codeword transmission is allowed, the codeword indication information indicates an enabled state of each codeword using a first value combination of a first indication domain, wherein a second target transport block (TB) is determined to be in a disabled state, in a case that each TB of each shared channel scheduled by the first DCI corresponds to a redundant version (RV) indication bit, a second modulation and coding scheme (MCS) index corresponding to the second target TB is 26 and a second RV index corresponding to the second target TB is 2; and wherein the second target TB is any TB corresponding to any shared channel scheduled by the first DCI.

14. The method according to claim 13, wherein before the receiving, by a network side device, first DCI, the method further comprises:

sending, by the network side device, configuration information of a time domain resource assignment table to a terminal, wherein the configuration information is for configuring a target row in the time domain resource assignment table, and a configuration rule for the target row comprises any one of the following:

each time domain resource assignment record in the target row corresponds to a feedback transmission time offset; and each time domain resource assignment record subset in the target row corresponds to a feedback transmission time offset, wherein the target row is any row in the time domain resource assignment table.

15. A terminal, comprising; a processor, a memory, and a program or instructions stored on the memory and executable on the processor, the program or the instructions, when executed by the processor, implementing the following steps:

receiving, first downlink control information (DCI), wherein the first DCI is for scheduling transmission of at least one shared channel, and the first DCI comprises scheduling information for the at least one shared channel, wherein the scheduling information comprises codeword indication information, wherein in a case that dual codeword transmission is allowed, the codeword indication information indicates an enabled state of each codeword using a first value combination of a first indication domain, wherein a second target transport block (TB) is determined to be in a disabled state, in a case that each TB of each shared channel scheduled by the first DCI corresponds to a redundant version (RV) indication bit, a second modulation and coding scheme (MCS) index corresponding to the second target TB is 26 and a second RV index corresponding to the second target TB is 2; and wherein the second target TB is any TB corresponding to any shared channel scheduled by the first DCI.

16. A network side device, comprising a processor, a memory, and a program or instructions stored on the memory and executable on the processor, the program or the instructions, when executed by the processor, implementing steps of the scheduling method for a shared channel according to any one of claim 13.

\* \* \* \* \*